United States Patent
Pagidi

(10) Patent No.: US 12,099,583 B2
(45) Date of Patent: Sep. 24, 2024

(54) METHOD FOR PROVIDING IoT DEVICES ACCESS TO RESTRICTED ACCESS INFORMATION

(71) Applicant: Carrier Corporation, Palm Beach Gardens, FL (US)

(72) Inventor: Govardhan Pagidi, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 307 days.

(21) Appl. No.: 17/631,992

(22) PCT Filed: Oct. 22, 2020

(86) PCT No.: PCT/US2020/056786
§ 371 (c)(1),
(2) Date: Feb. 1, 2022

(87) PCT Pub. No.: WO2021/086711
PCT Pub. Date: May 6, 2021

(65) Prior Publication Data
US 2022/0277061 A1    Sep. 1, 2022

(30) Foreign Application Priority Data
Oct. 30, 2019   (IN) .............................. 201911043955

(51) Int. Cl.
*G06F 21/31*   (2013.01)
*G06F 21/44*   (2013.01)

(52) U.S. Cl.
CPC .............. *G06F 21/31* (2013.01); *G06F 21/44* (2013.01); *G06F 2221/2111* (2013.01)

(58) Field of Classification Search
CPC ... G06F 21/31; G06F 21/44; G06F 2221/2111
USPC ............................................................ 726/4
See application file for complete search history.

(56) References Cited

U.S. PATENT DOCUMENTS

| | | | |
|---|---|---|---|
| 9,781,602 B1 * | 10/2017 | Girdhar | H04W 4/021 |
| 9,858,595 B2 * | 1/2018 | Barnes, Jr. | G06F 40/169 |
| 9,892,732 B1 * | 2/2018 | Tian | G10L 15/24 |
| 10,325,428 B1 * | 6/2019 | Kurian | G07C 9/00571 |
| 10,922,631 B1 * | 2/2021 | Shahidzadeh | H04W 4/029 |

(Continued)

OTHER PUBLICATIONS

International Preliminary Report on Patentability for International Application No. PCT/US2020/056786 mailing date of May 12, 2022.

(Continued)

*Primary Examiner* — Badrinarayanan
*Assistant Examiner* — Badri-Champakesan
(74) *Attorney, Agent, or Firm* — Carlson, Gaskey & Olds, P.C.

(57) ABSTRACT

A method of authenticating a request from an IoT device includes the step of receiving a request from an IoT device for restricted access information. A location of an authorized user of the restricted access information is identified based on at least one location criteria of the authorized user. Access of the restricted access information to the IoT device is granted when the authorized user satisfies the at least one location criteria and denying access to the IoT device of the restricted access information when the authorized user fails the at least one location criteria.

17 Claims, 2 Drawing Sheets

(56) References Cited

U.S. PATENT DOCUMENTS

| | | | | |
|---|---|---|---|---|
| 11,388,546 | B2* | 7/2022 | Williams | H04W 4/029 |
| 2019/0373445 | A1* | 12/2019 | Floury | H04W 12/50 |
| 2020/0120480 | A1* | 4/2020 | Chu | H04W 4/02 |
| 2020/0202866 | A1* | 6/2020 | Langenberg | G10L 15/22 |
| 2020/0293670 | A1* | 9/2020 | Haapanen | G06F 21/35 |
| 2021/0176637 | A1* | 6/2021 | Flynn, IV | H04W 12/08 |

OTHER PUBLICATIONS

International Search Report and Written Opinion for International Application No. PCT/US2020/056786 mailing date of Nov. 27, 2020.

* cited by examiner

METHOD FOR PROVIDING IoT DEVICES ACCESS TO RESTRICTED ACCESS INFORMATION

CROSS-REFERENCE TO RELATED APPLICATIONS

This application claims priority to Indian Application No. 201911043955, which was filed on Oct. 30, 2019 and is incorporated herein by reference.

BACKGROUND

The present disclosure relates to the use of internet of things devices ("IoT devices") and more particularly the use of IoT devices for accessing restricted access information intended only for authorized users.

IoT devices, such as Amazon Alexa or Google Home, play an increasing larger role in our everyday lives. IoT devices allow a user to easily automate the control of devices commonly found around the home or workplace, such as HVAC systems, audio systems, or other appliances. Because IoT devices may be used to automate systems with information that is restricted to use by authorized users, there is a need to verify that the user is authorized to access the information. The need to verify that a user is authorized increases when the IoT device responds to audible requests, such as voice commands of the user.

SUMMARY

In one exemplary embodiment, a method of authenticating a request from an IoT device includes the step of receiving a request from an IoT device for restricted access information. A location of an authorized user of the restricted access information is identified based on at least one location criteria of the authorized user. Access of the restricted access information to the IoT device is granted when the authorized user satisfies the at least one location criteria and denying access to the IoT device of the restricted access information when the authorized user fails the at least one location criteria.

In a further embodiment of any of the above, the request is an audible based request.

In a further embodiment of any of the above, the request for the restricted access information originates from an audible request to the IoT device.

In a further embodiment of any of the above, the request for the restricted access information from the IoT device is at least partially transmitted over the internet.

In a further embodiment of any of the above, the request for the restricted access information from the IoT device is communicated through a cloud based IoT system.

In a further embodiment of any of the above, a cloud based security system receives the request for restricted access information from the IoT device.

In a further embodiment of any of the above, the at least one location criteria includes GPS coordinates of a mobile device of the authorized user.

In a further embodiment of any of the above, the restricted access information includes a status of a security system.

In a further embodiment of any of the above, the status of the security system includes at least one of an armed status of the security system, identification of a triggered monitor in the security system, or access to visual data obtained by the security system.

In a further embodiment of any of the above, access to the restricted access information is granted if the GPS coordinates of the mobile device of the authorized user are within a predetermined distance of a security system associated with the restricted access information.

In a further embodiment of any of the above, access to the restricted access information is denied when the GPS coordinates of the mobile device of the authorized user are not within a predetermined distance of a security system associated with the restricted access information.

In a further embodiment of any of the above, the at least one location criteria includes a common network connection with a mobile device of the authorized user and the IoT device.

In a further embodiment of any of the above, access is granted to the restricted access information when the mobile device of the authorized user and the IoT device share a common network connection.

In a further embodiment of any of the above, access is denied to the restricted access information when the mobile device of the authorized user and the IoT device fail to share a common network connection.

In a further embodiment of any of the above, the common network connection is determined at least in part utilizing a bonjour protocol.

In a further embodiment of any of the above, the at least one location criteria includes GPS coordinates of a mobile device of the authorized user and a common network connection with the mobile device of the authorized user and the IoT device.

In a further embodiment of any of the above, access is granted to the restricted access information when both the GPS coordinates of the mobile device of the authorized user are within a predetermined distance of a security system and the common network connection is shared with the mobile device of the authorized user and the IoT device.

In a further embodiment of any of the above, access to the restricted access information is denied when at least one of the GPS coordinates of the mobile device of the authorized user are not within a predetermined distance of a security system and the mobile device of the authorized user and the IoT device fail to establish a common network connection.

In a further embodiment of any of the above, the method includes sending a notification to the authorized user if the request from the IoT device is denied.

In a further embodiment of any of the above, the method includes sending a notification to the authorized user if the request from the IoT device is granted.

DETAILED DESCRIPTION

This disclosure relates to an improvement in granting access to IoT devices used for home automation requesting restricted access information, such as a status of a security system, access to security camera footage, or other information not intended for public access or control. When a request for restricted access information is made through audible request to the IoT device, the audible request must be authenticated before the IoT device is granted access to the restricted access information. This disclosure is directed to authenticating an audible request made to an IoT device for restricted access information. The request may be authenticated using at least one location criteria associated with an authorized user as will be discussed in greater detail below.

Figure 1:
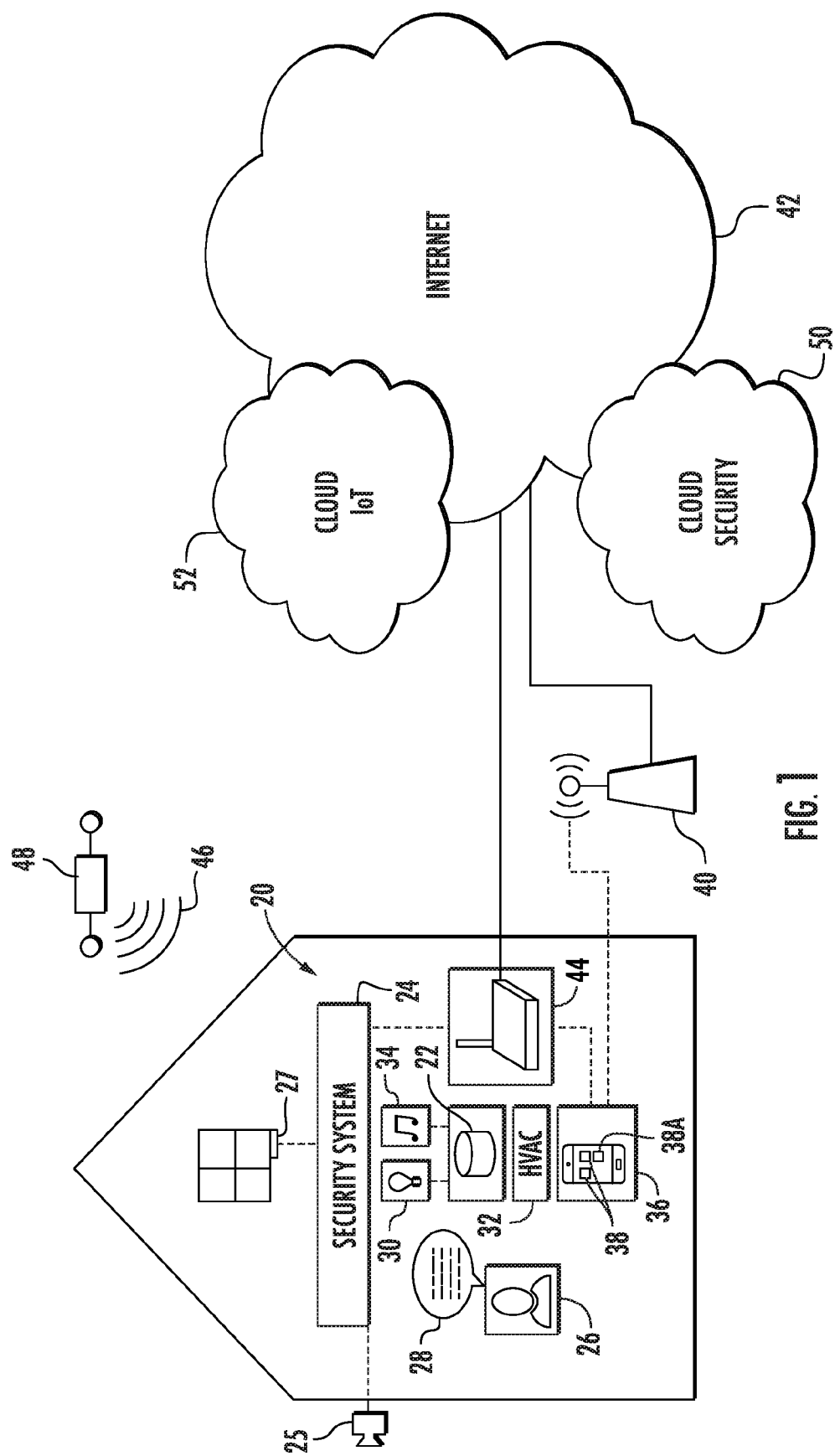
FIG. 1 schematically illustrates a network diagram incorporating an IoT device.

FIG. 1 illustrates an example network diagram 20 utilizing an IoT device 22 that is voice activated, such as Amazon Alexa or Google Home. The IoT device 22 is capable of controlling a number of household systems such as lighting systems 30, HVAC systems 32, audio systems 34, and other home systems or appliances. Generally, users are cautioned against linking the IoT devices 22 that are voice activated to systems with access to restricted access information, such as a security system 24.

Users are generally cautioned against linking IoT device 22 that are voice activated with security systems 24 due to the complexity of determining if the voice request received by the IoT device 22 originated from a user 26 that is authorized to access the security system 24 and/or the restricted access information. Although information regarding the security system 24 and the restricted access information may be mentioned separately, information regarding the security system could also be restricted access information. The ability to make this determination can prevent an unauthorized user from disabling the security system 24 or accessing the restricted access information. For example, the security system 24 may capture and store video footage in memory from a security camera 25 to access in real time or at a later date. Additionally, the security system can identify if a specific dwelling access point monitor 27 has triggered an alarm and silence the alarm associate with the triggered access point monitor 27.

When a user 26 provides an audible request 28 to the IoT device 22 relating to the security system 24 and/or another type of restricted access information, the user 26 must be authenticated before the request related to the security system 24 and/or restricted access information may be granted. Determining whether or not to grant the request is based at least partially on a location criteria of the user 26 that has been previously authorized to use the security system 24 and/or access the restricted access information.

The location criteria of the authorized user 26 are based at least in part on information gathered from a mobile device 36 of the user 26 that has been authorized to access and/or make changes to the security system 24 and/or the restricted access information. In the illustrated example, the mobile device 36 includes the ability to run applications 38 that are preprogrammed into the mobile device 36. The applications 38 include at least one security application 38A that has been preapproved or provided by a service company monitoring and/or maintaining the security system 24.

The mobile device 36 includes the ability to form a connection with a cellular network 40 to communicate over the internet 42. The mobile device 36 may also include the ability to form a wireless local area network ("WLAN") through a Wi-Fi connection with an access point 44 that is also in communication with the internet 42. Although only a single access point 44 is shown in the illustrated example, more than one access point 44 could be used to form the wireless local area network. In addition to cellular and internet connectivity, the mobile device 36 is capable of receiving GPS signals 46 received from satellites 48 to establish GPS coordinates of the mobile device 36.

The security application 38A is preprogrammed on the mobile device 36 provides information regarding the mobile device 36 of the authorized user to a cloud based security system 50 as shown in FIG. 1. Although the communication between the security application 38A and the cloud based security system 50 is shown at least partially over the internet 42, the communication could occur over the cellular network 40 in place of or in addition to the occurring over the internet 42. Alternatively, the cloud based security system 50 could send individual requests for information to the mobile device 36 that could be provided by the mobile device outside of using the specific security application 38A.

Figure 2:
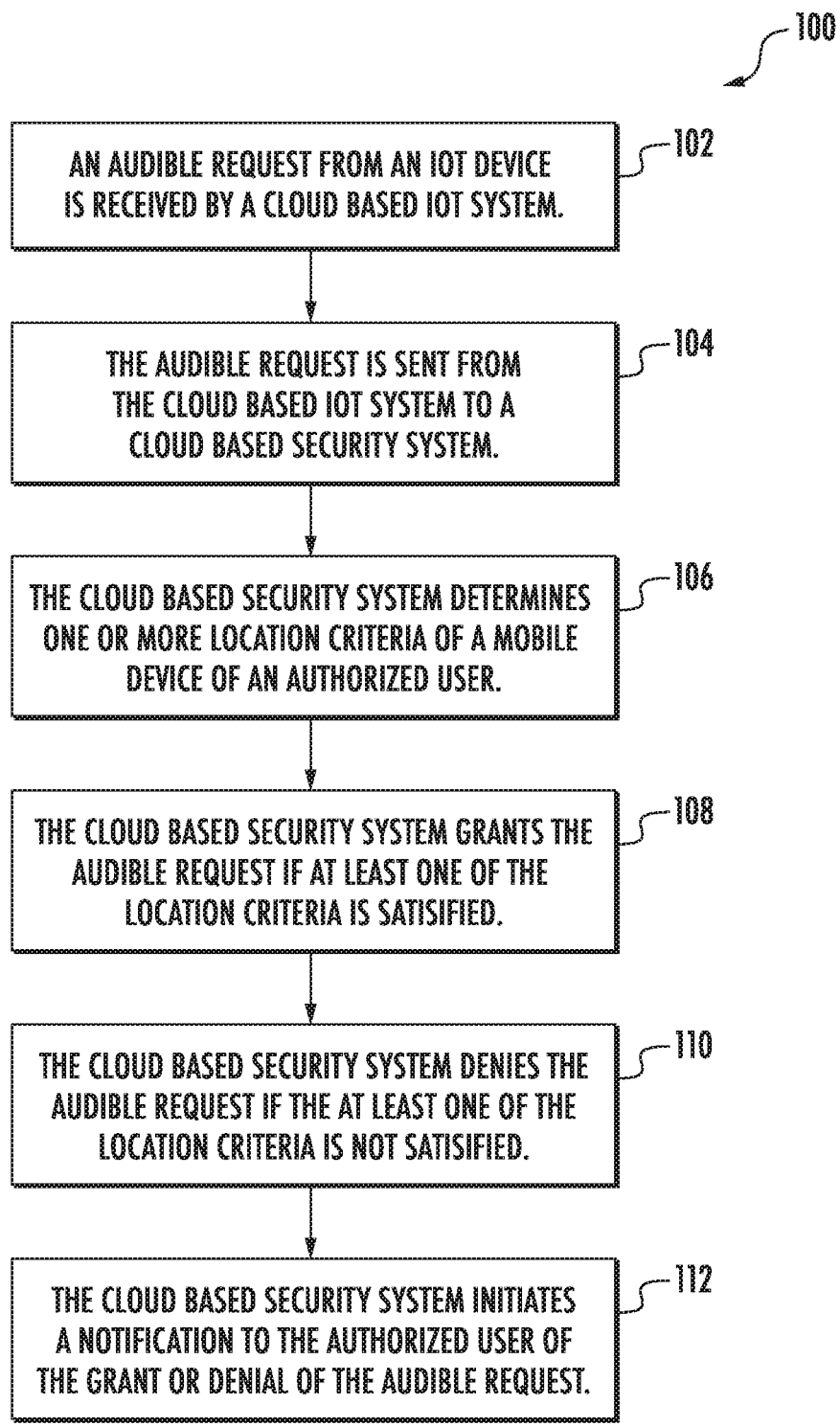
FIG. 2 illustrates a method of determining access for the IoT device to restricted access information.

FIG. 2 illustrates an example method 100 of authenticating the audible request 28 to the IoT device 22 according to this disclosure. When the audible request 28 is made by the user 26 to the IoT device 22 regarding a status of the security system 24 and/or the restricted access information, the audible request 28 is sent by the IoT device 22 to a cloud based IoT system 52 (Step 102). Alternatively, the audible request 28 could be communicated by the IoT device 22 directly to the cloud based security system 50.

The audible request 28 received by the IoT device 22 may be communicated at least partially over the internet 42. When the cloud based IoT system 52 is used, the cloud based IoT system 52 can send the audible request 28 regarding the security system 24 and/or the restricted access information to the cloud based security system 50 (Step 104). The communication between the cloud based IoT system 52 and the cloud based security system 50 may also occur at least partially over the internet 42. When the audible request 28 is sent the by the IoT device 22 to one of the cloud based IoT system 52 or the cloud based security system 50, the audible request 28 may be converted from sound to a computer readable instruction deciphered by the IoT device 22 and/or the cloud based IoT system 52.

The cloud based security system 50 determines if the audible request 28 related to the security system 24 and/or the restricted access information should be granted. The cloud based security system 50 determines location criteria of the mobile device 36 of the authorized user (Step 106). One of the location criteria includes GPS coordinates of the mobile device 36 of the authorized user. The GPS coordinates of the mobile device 36 of the authorized user are compared to the GPS coordinates of the security system 24 to determine if the mobile device 36 of the authorized user is within a predetermined range of the security system 24. If the mobile device 36 of the authorized user is within the predetermined range of the security system 24, the cloud based security system 50 grants the audible request 28 made to the IoT device 22 of the status of the security system and/or access to the restricted access information (Step 108). If the mobile device 36 of the authorized user is not within a predetermined range of the security system 24, the cloud based security system 50 denies the audible request 28 made to the IoT device 22 of the status of the security system 24 and/or access to the restricted access information (Step 110).

Another location criteria considered includes a shared or common network connection between the mobile device 36 of the authorized user and the IoT device 22. One method of determining a shared network connection between the IoT device 22 and the mobile device 36 of the authorized user is through utilizing a bonjour protocol. If the mobile device 36 of the authorized user shares a common network connection with the IoT device 22 as determined at least in part by use of the bonjour protocol, the cloud based security system 50 grants the audible request 28 made to the IoT device 22 of the status of the security system 24 and/or access to the restricted access information (Step 108). If the mobile device 36 of the authorized user does not share a common network connection with the IoT device 22, the cloud based security system 50 denies the audible request 28 made to the IoT device 22 of the status of the security system 24 and/or access to the restricted access information (Step 110).

When the cloud based security system 50 grants or denies the audible request 28 made to the IoT device 22 of the status of the security system 24 and/or to the restricted access information based on either the GPS coordinates or the common network connection, the cloud based security system 50 could initiate a notification to the mobile device 36 of the authorized user regarding the decision (Step 112). The notification could be sent through the security application 38A associated with the mobile device 36 of the authorized user, as a text based (SMS) message, email, or through another messenger service. The authorized user can then change an operational status of the security system through the security application 38A, such as disabling the security system from communicating with the IoT device 22 if needed or decide not to take any action.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of authenticating a request from an IoT device comprising the steps of:
   receiving a request from an IoT device for restricted access information, wherein the request is an audible based request;
   identifying a location of an authorized user of the restricted access information based on at least one location criteria of the authorized user, and wherein the at least one location criteria includes GPS coordinates of a mobile device of the authorized user and a common network connection with the mobile device of the authorized user and the IoT device; and
   granting access of the restricted access information to the IoT device in response to determining that the authorized user satisfies the at least one location criteria and denying access to the IoT device of the restricted access information in response to determining that the authorized user fails the at least one location criteria.

2. The method of claim 1, wherein the request for the restricted access information originates from an audible request to the IoT device.

3. The method of claim 2, wherein the request for the restricted access information from the IoT device is at least partially transmitted over an internet.

4. The method of claim 3, wherein the request for the restricted access information from the IoT device is communicated through a cloud based IoT system.

5. The method of claim 3, wherein a cloud based security system receives the request for restricted access information from the IoT device.

6. The method of claim 1, wherein the restricted access information includes a status of a security system.

7. The method of claim 6, wherein the status of the security system includes at least one of an armed status of the security system, identification of a triggered monitor in the security system, or access to visual data obtained by the security system.

8. The method of claim 1, wherein access to the restricted access information is granted in response to determining that the GPS coordinates of the mobile device of the authorized user are within a predetermined distance of a security system associated with the restricted access information.

9. The method of claim 1, wherein access to the restricted access information is denied in response to determining that the GPS coordinates of the mobile device of the authorized user are not within a predetermined distance of a security system associated with the restricted access information.

10. The method of claim 1, wherein access is granted to the restricted access information in response to determining that the mobile device of the authorized user and the IoT device share a common network connection.

11. A method of authenticating a request from an IoT device comprising the steps of:
    receiving a request from an IoT device for restricted access information;
    identifying a location of an authorized user of the restricted access information based on at least one location criteria of the authorized user, wherein the at least one location criteria includes a common network connection with a mobile device of the authorized user and the IoT device; and
    granting access of the restricted access information to the IoT device in response to determining that the authorized user satisfies the at least one location criteria and denying access to the IoT device of the restricted access information in response to determining that the authorized user fails the at least one location criteria, and wherein access is granted to the restricted access information in response to determining that the mobile device of the authorized user and the IoT device share a common network connection, and wherein access is denied to the restricted access information in response to determining that the mobile device of the authorized user and the IoT device fail to share a common network connection.

12. The method of claim 1, wherein the common network connection is determined at least in part utilizing a bonjour protocol.

13. The method of claim 1, wherein access is granted to the restricted access information in response to determining that both the GPS coordinates of the mobile device of the authorized user are within a predetermined distance of a security system and the common network connection is shared with the mobile device of the authorized user and the IoT device.

14. A method of authenticating a request from an IoT device comprising the steps of:
    receiving a request from an IoT device for restricted access information;
    identifying a location of an authorized user of the restricted access information based on at least one location criteria of the authorized user, wherein the at least one location criteria includes GPS coordinates of a mobile device of the authorized user and a common network connection with the mobile device of the authorized user and the IoT device; and granting access of the restricted access information to the IoT device in response to determining that the authorized user satisfies the at least one location criteria and denying access to the IoT device of the restricted access information in response to determining that the authorized user fails the at least one location criteria, wherein access to the restricted access information is denied in response to determining that at least one of the GPS coordinates of the mobile device of the authorized user are not within a predetermined distance of a security system and the mobile device of the authorized user and the IoT device fail to establish a common network connection.

15. The method of claim 1, further comprising sending a notification to the authorized user in response to determining that the request from the IoT device is denied.

16. The method of claim 1, further comprising sending a notification to the authorized user in response to determining that the request from the IoT device is granted.

17. A method of authenticating a request from an IoT device comprising the steps of:

receiving a request from an IoT device for restricted access information, wherein the request is an audible based request;

identifying a location of an authorized user of the restricted access information based on at least one location criteria of the authorized user; and granting access of the restricted access information to the IoT device in response to determining that the authorized user satisfies the at least one location criteria and denying access to the IoT device of the restricted access information in response to determining that the authorized user fails the at least one location criteria, wherein the IoT device comprises a voice activated device, and wherein the request from the IoT device for restricted access information pertains to a security system for a building that captures and stores video footage in memory from a security camera and/or identifies if a specific building access point monitor has triggered an alarm.

* * * * *